US009576342B2

(12) United States Patent
Sohgawa et al.

(10) Patent No.: US 9,576,342 B2
(45) Date of Patent: Feb. 21, 2017

(54) IMAGE PROCESSING APPARATUS, NON-TRANSITORY COMPUTER-READABLE MEDIUM, AND IMAGE PROCESSING METHOD

(71) Applicants: Norimasa Sohgawa, Kanagawa (JP); Masanori Hirano, Kanagawa (JP); Shinichi Hatanaka, Tokyo (JP)

(72) Inventors: Norimasa Sohgawa, Kanagawa (JP); Masanori Hirano, Kanagawa (JP); Shinichi Hatanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/624,649

(22) Filed: Feb. 18, 2015

(65) Prior Publication Data

US 2015/0254505 A1 Sep. 10, 2015

(30) Foreign Application Priority Data

Mar. 4, 2014 (JP) ................................ 2014-041971

(51) Int. Cl.
*G06K 9/00* (2006.01)
*G06T 5/00* (2006.01)
*B41F 33/00* (2006.01)

(52) U.S. Cl.
CPC ............. *G06T 5/00* (2013.01); *B41F 33/0036* (2013.01)

(58) Field of Classification Search
None
See application file for complete search history.

(56) References Cited

U.S. PATENT DOCUMENTS

2005/0191575 A1* 9/2005 Sugiura ................ G03G 9/0806 430/110.3
2006/0288895 A1* 12/2006 Potzkai ................ B41F 13/025 101/485
2011/0273746 A1* 11/2011 Hoshino ................ B41J 2/21 358/3.06
2013/0120769 A1* 5/2013 Kakutani ................ G06K 15/10 358/1.8
2014/0255645 A1* 9/2014 Shumaker ................ B05C 9/022 428/99
2016/0155032 A1* 6/2016 Morovic ................ H04N 1/6025 358/504

FOREIGN PATENT DOCUMENTS

JP 2011-056705 3/2011
JP 4796388 8/2011

* cited by examiner

*Primary Examiner* — Oneal R Mistry
(74) *Attorney, Agent, or Firm* — Cooper & Dunham LLP

(57) ABSTRACT

An image processing apparatus includes an acquiring unit, an identifying unit, and a correcting unit. The acquiring unit acquires input data including shape data on a concave-convex area having a convex part and a concave part and image data of an image formed on the concave-convex area. The identifying unit identifies an uneven area which is within a bottom surface of the concave part and is continuous with a wall surface connecting the bottom surface and a convex surface of the convex part. The correcting unit corrects the image data so that the brightness of a first image area in the uneven area stacked with multiple dots and the brightness of a second image area continuous with the first image area become about the same.

10 Claims, 10 Drawing Sheets

(A)

(B)

IMAGE PROCESSING APPARATUS, NON-TRANSITORY COMPUTER-READABLE MEDIUM, AND IMAGE PROCESSING METHOD

CROSS-REFERENCE TO RELATED APPLICATIONS

The present application claims priority to and incorporates by reference the entire contents of Japanese Patent Application No. 2014-041971 filed in Japan on Mar. 4, 2014.

BACKGROUND OF THE INVENTION

1. Field of the Invention

The present invention relates to an image processing apparatus, a non-transitory computer-readable recording medium and an image processing method.

2. Description of the Related Art

There is known an ink-jet recording apparatus that forms an image by discharging liquid droplets such as ink from a nozzle. Furthermore, there has been disclosed a technology to form an image on a concave-convex area by using an ink-jet method. Moreover, there has been disclosed a technology to spray color coating on a portion of a concave-convex area from a bottom surface of a concave part to a rising surface leading to a convex surface of a convex part as well.

However, to color wall surfaces continuous with a convex surface of a convex part and a bottom surface of a concave part in a concave-convex area, if an uneven area is applied with ink droplets stacked in several layers from the base of the uneven area, the brightness of the uneven area decreases, thereby the uneven area may differ in color tone from other areas and decrease in image quality.

Therefore, it is desirable to provide an image processing apparatus, a non-transitory computer-readable recording medium, and an image processing method capable of suppressing decrease in image quality.

SUMMARY OF THE INVENTION

It is an object of the present invention to at least partially solve the problems in the conventional technology.

According to an aspect of the present invention, there is provided an image processing apparatus including: an acquiring unit that acquires input data including shape data on a concave-convex area having a convex part and a concave part and image data of an image formed on the concave-convex area; an identifying unit that identifies an uneven area which is within a bottom surface of the concave part and is continuous with a wall surface connecting the bottom surface and a convex surface of the convex part; and a correcting unit that corrects the image data so that the brightness of a first image area in the uneven area stacked with multiple dots and the brightness of a second image area continuous with at least the first image area become about the same.

According to another aspect of the present invention, there is provided a non-transitory computer-readable medium comprising computer readable program codes, performed by a computer, the program codes when executed causing the computer to execute: acquiring input data including shape data on a concave-convex area having a convex part and a concave part and image data of an image formed on the concave-convex area; identifying an uneven area which is within a bottom surface of the concave part and is continuous with a wall surface connecting the bottom surface and a convex surface of the convex part; and correcting the image data so that the brightness of a first image area in the uneven area stacked with multiple dots and the brightness of a second image area continuous with at least the first image area become about the same.

According to still another aspect of the present invention, there is provided an image processing method performed by a computer, the method including: acquiring input data including shape data on a concave-convex area having a convex part and a concave part and image data of an image formed on the concave-convex area; identifying an uneven area which is within a bottom surface of the concave part and is continuous with a wall surface connecting the bottom surface and a convex surface of the convex part; and correcting the image data so that the brightness of a first image area in the uneven area stacked with multiple dots and the brightness of a second image area continuous with at least the first image area become about the same.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an image processing apparatus, an image processing program, an image processing method, and an image processing system according to the present invention will be explained in detail below with reference to accompanying drawings.

Figure 1:
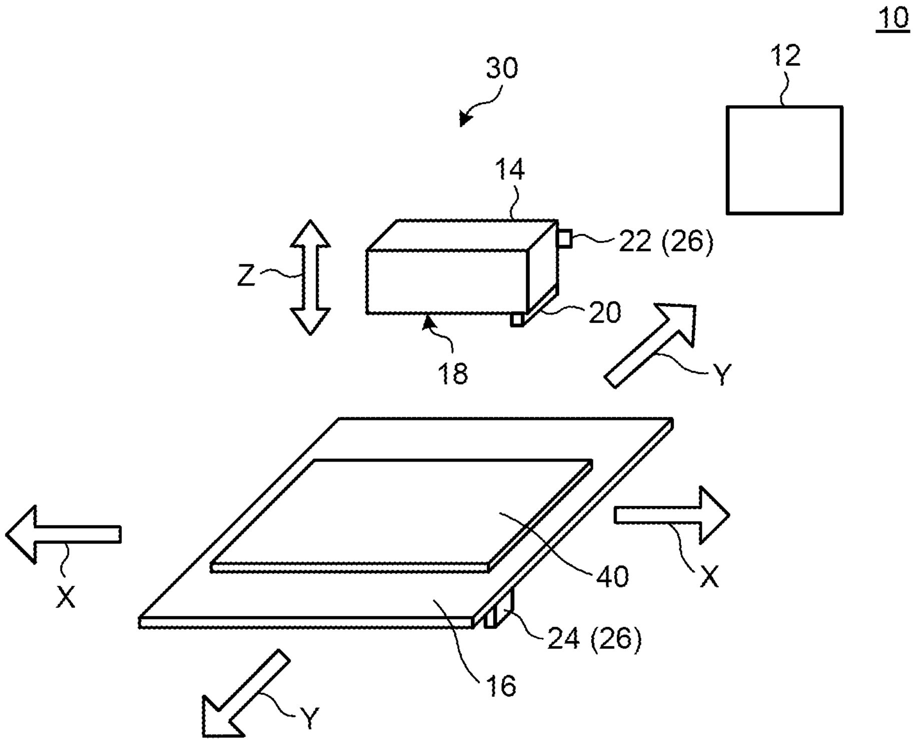
FIG. 1 is a diagram showing an example of an image processing system.

FIG. 1 is a diagram showing an example of an image processing system 10.

The image processing system 10 includes an image processing apparatus 12 and a recording apparatus 30. The image processing apparatus 12 and the recording apparatus 30 are connected so that they can communicate with each other.

The recording apparatus 30 includes a recording unit 14, an operating stage 16, and a drive unit 26. The recording unit 14 has a plurality of nozzles 18. The recording unit 14 is an ink-jet recording unit, and records dots by discharging liquid droplets from the nozzles 18. The nozzles 18 are installed on an opposed surface of the recording unit 14 which is opposed to the operating stage 16.

In the present embodiment, the liquid droplets are ink containing color material. Furthermore, in the present embodiment, the ink contains photo-curable resin that is cured by irradiation of light. The light is, for example, ultraviolet rays. Therefore, the ink in the present embodiment is cured by being irradiated with light after the ink has been discharged. Incidentally, the liquid droplets discharged by the recording unit 14 are not limited to those containing photo-curable resin.

On the opposed surface of the recording unit 14 which is opposed to the operating stage 16, an irradiating unit 20 is installed. The irradiating unit 20 irradiates a recording medium 40 with light of a wavelength which cures ink discharged from the nozzles 18. Incidentally, when ink containing no photo-curable resin is used as the ink, the recording unit 14 can be configured not to the irradiating unit 20.

The operating stage 16 holds thereon the recording medium 40 onto which ink is discharged. The drive unit 26 relatively moves the recording unit 14 and the operating stage 16 in a vertical direction (a direction of arrow Z in FIG. 1), a main-scanning direction X perpendicular to the vertical direction Z, and a sub-scanning direction Y perpendicular to the vertical direction Z and the main-scanning direction X.

In the present embodiment, a plane indicated by the main-scanning direction X and the sub-scanning direction Y corresponds to an XY plane along an opposed surface of the operating stage 16 which is opposed to the recording unit 14.

The drive unit 26 includes a first drive unit 22 and a second drive unit 24. The first drive unit 22 moves the recording unit 14 in the vertical direction Z, the main-scanning direction X, and the sub-scanning direction Y. The second drive unit 24 moves the operating stage 16 in the vertical direction Z, the main-scanning direction X, and the sub-scanning direction Y. Incidentally, the recording apparatus 30 can be configured to include either the first drive unit 22 or the second drive unit 24.

Figure 2:
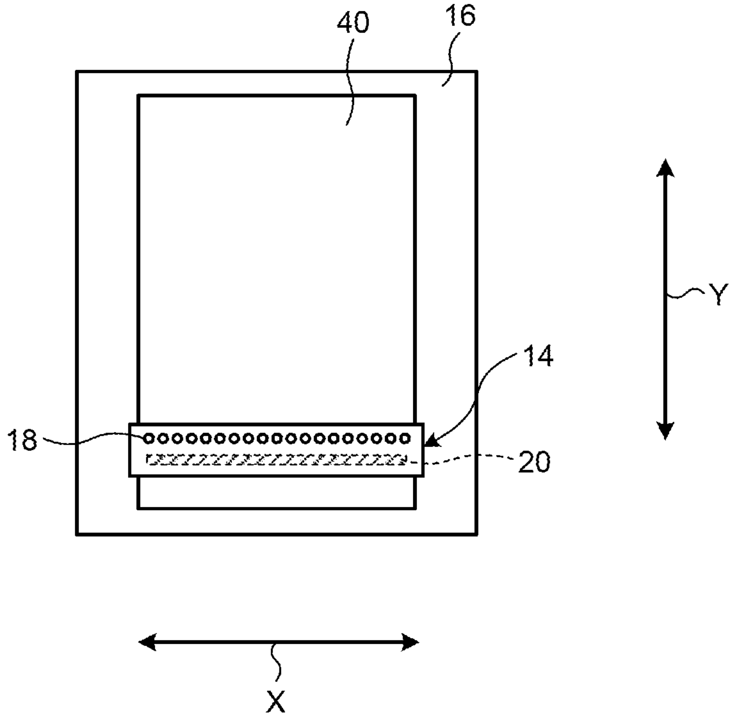
FIG. 2 is an explanatory diagram of a recording unit.
Figure 2:
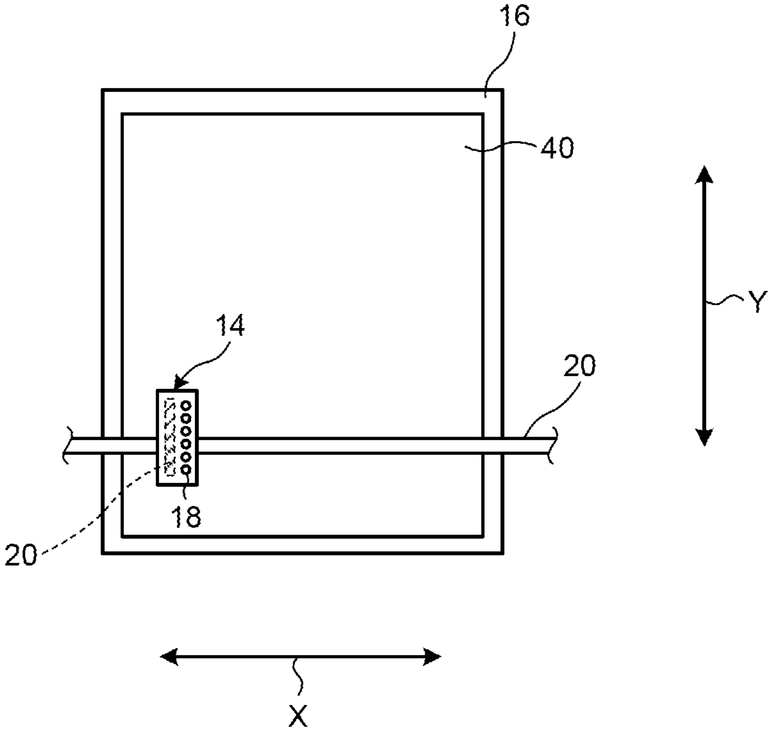

FIG. 2 is an explanatory diagram of the recording unit 14.

FIG. 2(A) is an explanatory diagram of a one-pass type (may also be referred to as "single-pass type") of recording unit 14. The one-pass type is a type of forming an image by causing the recording medium 40 to pass through the recording unit 14 relatively in the sub-scanning direction Y. In this case, the recording unit 14 has a configuration in which the nozzles 18 are arranged to be aligned at least in the main-scanning direction X. Incidentally, the recording unit 14 can have a configuration in which the nozzles 18 are arranged to be aligned in both the main-scanning direction X and the sub-scanning direction Y. An image is formed on the recording medium 40 by discharging ink from the nozzles 18 of the recording unit 14 and relatively moving the recording unit 14 and the recording medium 40. Furthermore, when multiple dots are stacked in layers, dots in each layer are recorded by moving the recording medium 40 relatively in the vertical direction Z.

FIG. 2(B) is an explanatory diagram of a multi-pass type of recording unit 14. The multi-pass type is a type of forming an image by reciprocating the recording unit 14 relatively in the main-scanning direction X with respect to the recording medium 40 and moving the recording medium 40 relatively in the sub-scanning direction Y. In this case, the recording unit 14 has, for example, a configuration in which the nozzles 18 are arranged to be aligned in both the main-scanning direction X and the sub-scanning direction Y. Incidentally, the recording unit 14 can have a configuration in which the nozzles 18 are arranged to be aligned in either the main-scanning direction X or the sub-scanning direction Y.

Incidentally, in FIG. 2, the nozzles 18 are installed on the opposed surface of the recording unit 14 which is opposed to the operating stage 16. Therefore, the nozzles 18 are arranged so that ink can be discharged to the side of the operating stage 16.

Figure 3:
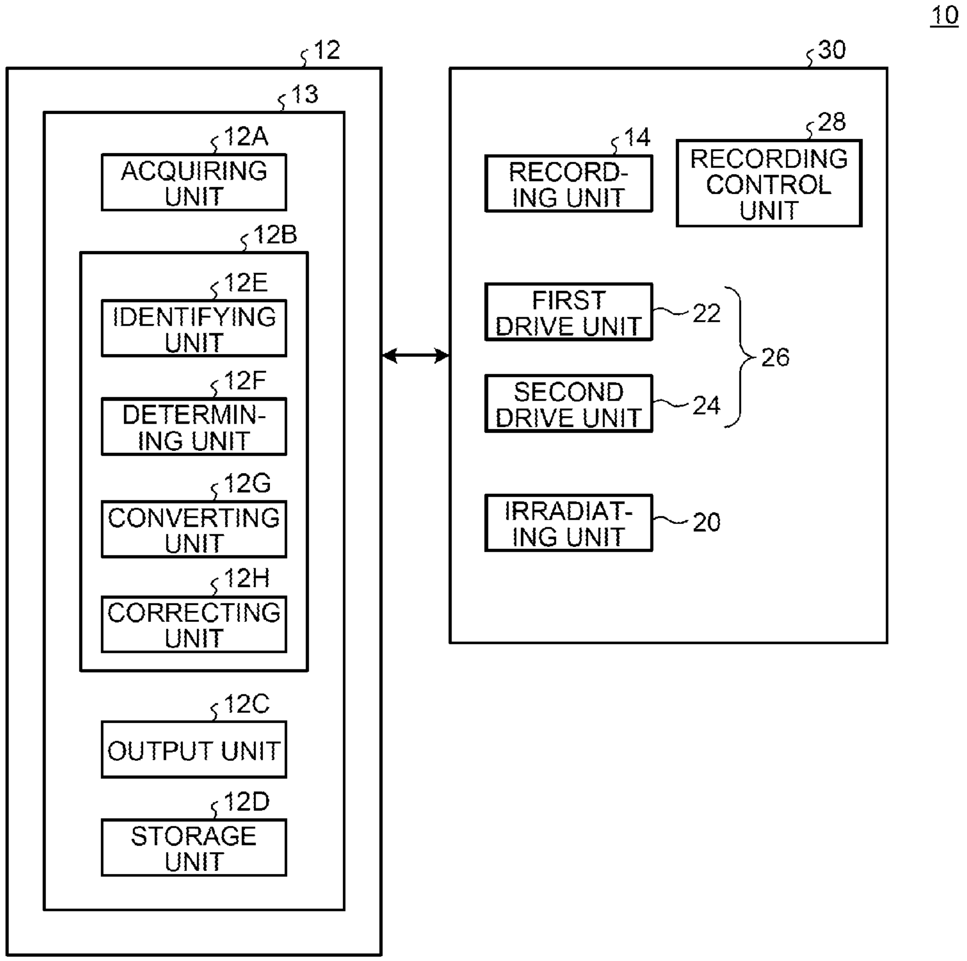
FIG. 3 is a functional block diagram of the image processing system.

FIG. 3 is a functional block diagram of the image processing system 10.

The image processing apparatus 12 includes a main control unit 13. The main control unit 13 is a computer including a central processing unit (CPU), etc., and controls the entire image processing apparatus 12. Incidentally, the main control unit 13 can be composed of hardware other than a general CPU. For example, the main control unit 13 can be composed of a circuit, etc.

The main control unit 13 includes an acquiring unit 12A, a generating unit 12B, an output unit 12C, and a storage unit 12D. The generating unit 12B includes an identifying unit 12E, a determining unit 12F, a converting unit 12G, and a correcting unit 12H.

Some or all of the acquiring unit 12A, the generating unit 12B (the identifying unit 12E, the determining unit 12F, the converting unit 12G, and the correcting unit 12H), and the output unit 12C can be realized by causing a processing apparatus such as the CPU to execute a program, i.e., by software, or can be realized by hardware such as an integrated circuit (IC), or can be realized by a combination of software and hardware.

The acquiring unit 12A acquires input data. The input data includes shape data and image data.

The shape data is data on the surface shape of a concave-convex area having a concave part and a convex part. Furthermore, the shape data is data on the shape of a target area where an image is formed. That is, in the present embodiment, the recording apparatus 30 forms an image on the concave-convex area. Incidentally, the shape data just has to be data on the shape of an area including the concave-convex area as a target area where an image is formed. That is, the whole target area where an image is formed is not limited to have a concave-convex shape.

In the present embodiment, a concave-convex area where an image is formed is formed by forming base dots and adjusting the number of layers of the base dots stacked. The base dots are, for example, dots formed of liquid droplets containing no color material. Incidentally, the base dots can be formed of liquid droplets containing predetermined color material determined as base color. The image data is image data of an image to be formed on the concave-convex area.

Figure 4:
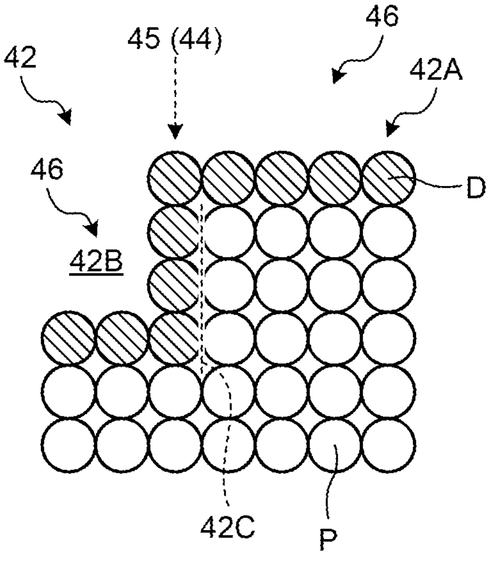
FIG. 4 is an explanatory diagram of an example of input data.

FIG. 4 is an explanatory diagram of an example of the input data.

In the present embodiment, the shape data is data for forming a concave-convex area 42 by stacking a plurality of base dots P. Specifically, the shape data is data for forming the concave-convex area 42 including a concave part 42B, a convex part 42A, and a wall surface 42C connecting a bottom surface of the concave part 42B and a convex surface of the convex part 42A from base dots P. In the present embodiment, the shape data is data which defines the number of layers of base dots P stacked in each pixel position and a gradation value of a pixel corresponding to each base dot P.

The image data is image data of an image to be formed on the concave-convex area 42. The image data is data on the number of layers of dots D stacked in each pixel position, a gradation value of a pixel corresponding to each dot D, and color information of the pixel corresponding to the dot D.

In the present embodiment, the image data includes first image data of a first image area 45 and second image data of a second image area 46.

The first image area 45 is an area of an image formed on an uneven area 44, and is an area on which dots D are recorded by being stacked in layers according to the level difference of the uneven area 44.

The second image area 46 is an area of an image continuous with at least the first image area 45 in the image formed from the dots D. Incidentally, the second image area 46 just has to be an area of one or more dots D continuous with at least the first image area 45. In the present embodiment, as an example, the second image area 46 is described as an area other than the first image area 45 in the image formed on the concave-convex area 42.

The uneven area 44 is an area in the bottom surface of the concave part 42B of the concave-convex area 42 and is continuous with the wall surface 42C. In the present embodiment, the uneven area 44 represents an area of one dot continuous with the wall surface 42C in the bottom surface of the concave part 42B. The level difference of the uneven area 44 corresponds to the height (thickness) from the bottom surface to the convex surface connected through the wall surface 42C.

The first image data is data which defines the number of layers of dots D stacked in each pixel position of pixels corresponding to the uneven area 44, a gradation value of a pixel corresponding to each dot D, and color information of the pixel corresponding to the dot D. As described above, the first image area 45 is an area on which dots D are recorded by being stacked in layers according to the level difference of the uneven area 44. Therefore, the first image data of the first image area 45 is data which defines respective pieces of color information and gradation values of multiple pixels corresponding to multiple dots D according to the number of layers with respect to each pixel position.

The second image data is data which defines the number of layers of dots D stacked in each pixel position of pixels corresponding to an area other than the uneven area 44, a gradation value of a pixel corresponding to each dot D, and color information of the pixel corresponding to the dot D.

In the present embodiment, for convenience of explanation, gradation values of pixels corresponding to base dots P and gradation values of pixels corresponding to dots D included in the image data and shape data of the input data are assumed to be the same.

To return to FIG. 3, the generating unit 12B generates print data of an image that the recording unit 14 of the recording apparatus 30 can form from the input data acquired by the acquiring unit 12A.

Here, a conventional method for forming an image on the concave-convex area 42 is explained.

Figure 5:
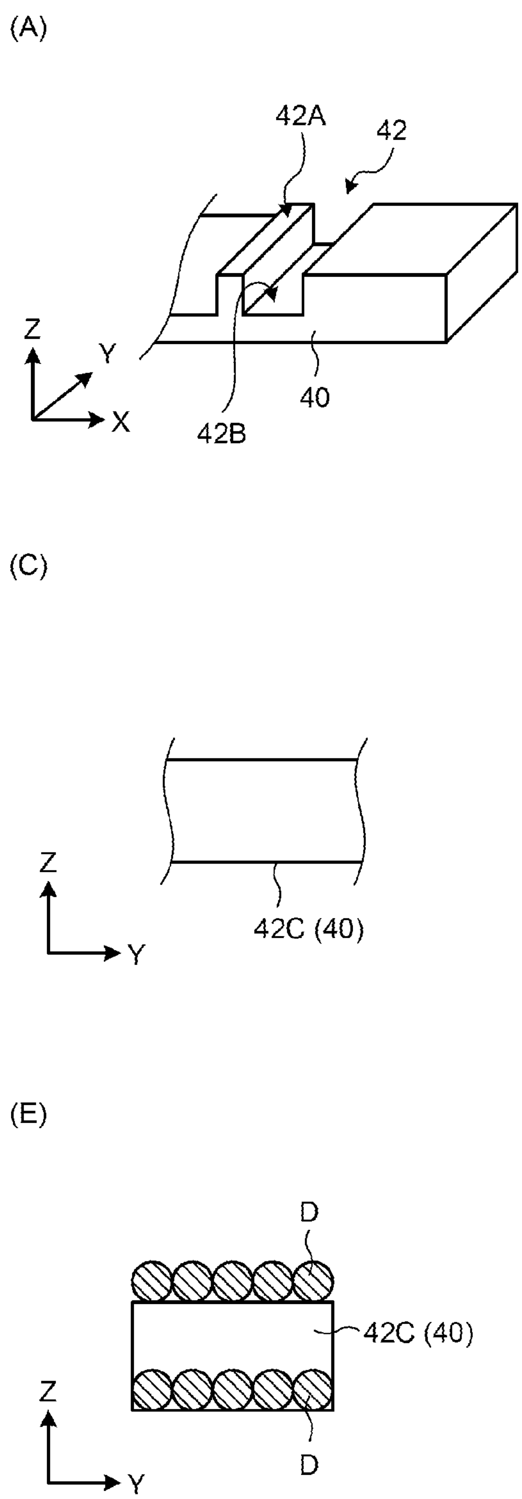
FIG. 5 is an explanatory diagram of a conventional method.

FIG. 5 is an explanatory diagram of the conventional method for forming an image on the concave-convex area 42. FIG. 5(A) is a perspective view of the recording medium 40. FIG. 5(B) is a cross-sectional view of the recording medium 40 along the Z direction. FIG. 5(C) is a YZ-plane view of the wall surface 42C of the recording medium 40 viewed from the X-axis direction.

As shown in FIGS. 5(A) to 5(C), first, prepare the recording medium 40 having the concave-convex area 42. The concave-convex area 42 has the convex part 42A, the concave part 42B, and the wall surface 42C continuous with the convex part 42A and the concave part 42B. In the conventional method, when an image is formed on this concave-convex area 42, an image is formed by forming dots D on the bottom surface of the concave part 42B and the convex surface of the convex part 42A in the concave-convex area 42.

FIG. 5(D) is a cross-sectional view of the recording medium 40 on which the dots D have been formed along the Z direction. FIG. 5(E) is a YZ-plane view of the wall surface 42C of the recording medium 40 on which the dots D have been formed viewed from the X-axis direction. As shown in FIGS. 5(D) and 5(C), in the conventional method shown in FIG. 5, no dots D are formed on the wall surface 42C. Therefore, the boundary between the convex part 42A and the concave part 42B is visually recognized as a streak at a part corresponding to the wall surface 42C in an image formed on the concave-convex area 42, and the image quality is deteriorated.

Figure 6:
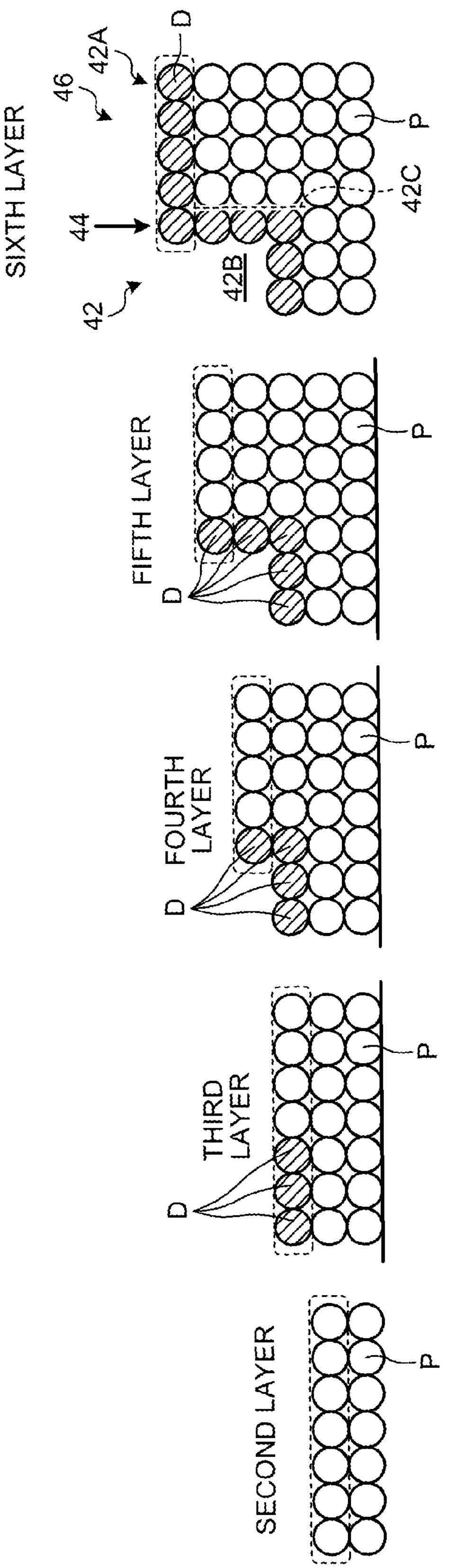
FIG. 6 is an explanatory diagram of a conventional method.
Figure 7:
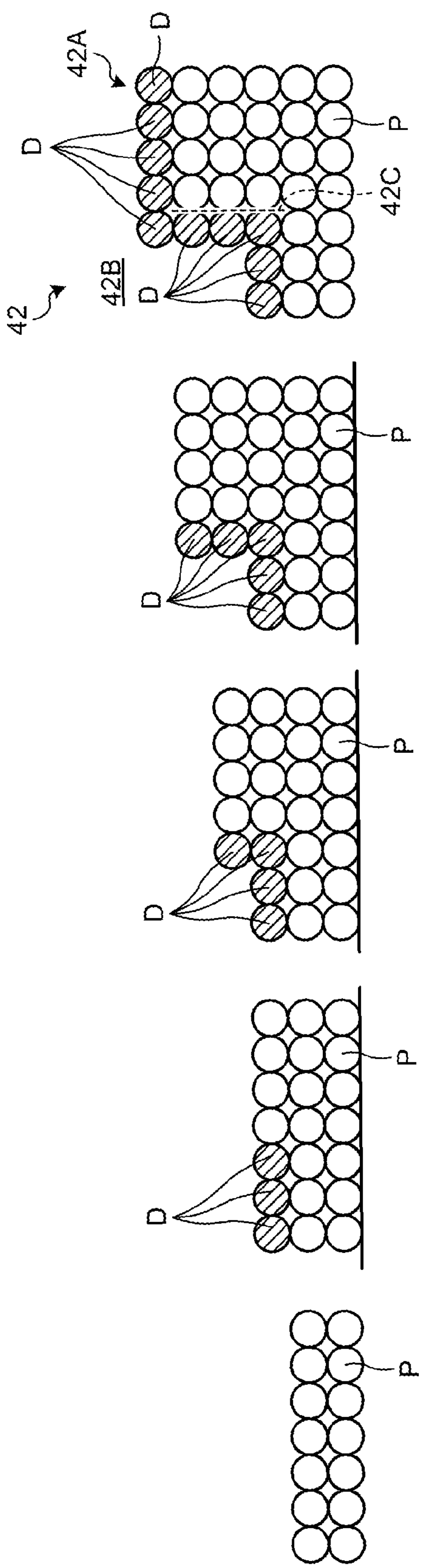
FIG. 7 is an explanatory diagram of a conventional method.

FIGS. 6 and 7 are explanatory diagrams of other conventional methods for forming an image on the concave-convex area 42. The conventional method shown in FIG. 6 is a method for simultaneously forming a concave-convex area 42 and an image by forming the concave-convex area 42 from base dots P and forming the image from dots D.

As shown in FIG. 6, the base dots P are stacked in order from the lower layer according to the unevenness of the concave-convex area 42, and the dots D are formed. In this case, multiple dots D are stacked on the uneven area 44 continuous with the wall surface 42C in the concave part 42B of the concave-convex area 42. Accordingly, the dots D are stacked along the wall surface 42C.

Furthermore, ink for forming the dots D and base ink for forming the base dots P differ in type. Therefore, when there is a difference in thickness between the dot D and the base dot P, a concave-convex area 42 composed of base dots P and an image composed of dots D shown in FIG. 7 are formed.

As shown in FIGS. 6 and 7, when the conventional methods for simultaneously forming the concave-convex area 42 and the image are used, dots D can be stacked along the wall surface 42C; however, the following problem arises.

Figure 8:
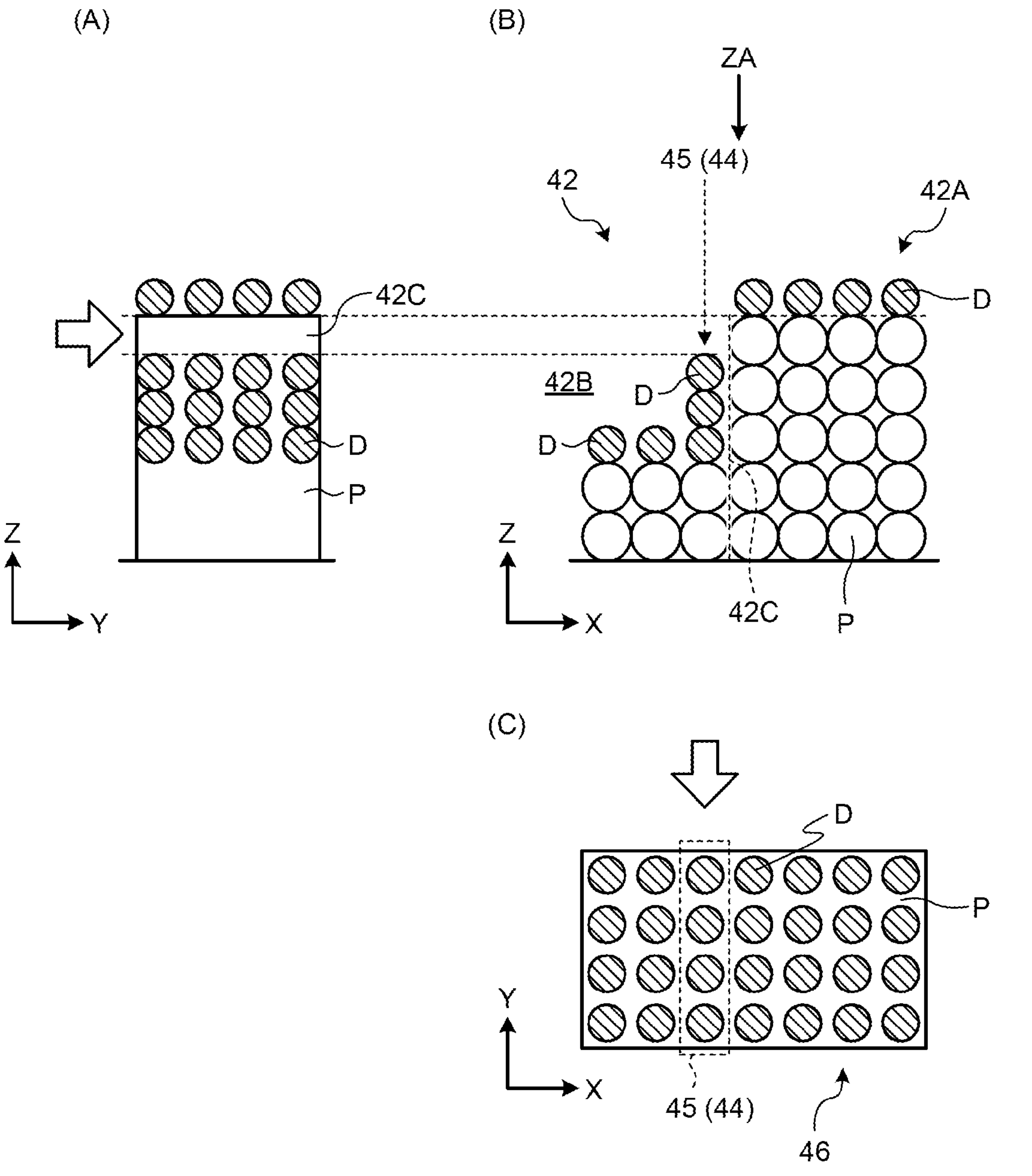
FIG. 8 is an explanatory diagram of a conventional problem.

FIG. 8 is an explanatory diagram of the conventional problem. FIG. 8(A) is a YZ-plane view of the wall surface 42C of the conventional concave-convex area 42 composed of base dots P on which dots D have been formed viewed from the X-axis direction. FIG. 8(B) is a cross-sectional view of the conventional concave-convex area 42 composed of base dots P on which dots D have been formed along the Z direction. FIG. 8(C) is an XY-plane view of the image formed on the conventional concave-convex area 42 composed of base dots P viewed from the side of the vertical direction Z.

As shown in FIG. 8(C), in the conventional method, the brightness of the first image area 45 in the uneven area 44 stacked with dots D (see FIG. 8(B)) is lower than that of the second image area 46 which is an area continuous with the first image area 45. This is because even if an amount of ink discharged for forming each dot D is the same, the number of layers of dots D stacked on the first image area 45 is larger than the second image area 46, so the superposition of colors decreases the brightness.

Therefore, in the conventional method, due to decrease in brightness of the first image area 45 formed on the uneven area 44 to a lower level than the second image area 46, the uneven area 44 may be visually recognized as a streak with a different color tone from other areas. Therefore, there is decrease in image quality.

Furthermore, in the conventional method, as shown in FIGS. 8(A) and 8(B), a part of the wall surface 42C may be exposed from dots D, which decreases the image quality.

To return to FIG. 3, the generating unit 12B in the present embodiment includes the identifying unit 12E, the determining unit 12F, the converting unit 12G, and the correcting unit 12H.

The converting unit 12G converts the shape data and image data included in the input data into a data form that the recording unit 14 can process. For example, the converting unit 12G converts the shape data and the image data into a raster data format which shows a gradation value and color information on a pixel-to-pixel basis. Incidentally, when the input data is raster data, the converting unit 12G skips the conversion into raster data. Furthermore, the converting unit 12G converts the color space of the image data so that the color of the image data corresponds to the color space of ink discharged by the recording unit 14. For example, the converting unit 12G converts RGB color space into CMYK color space.

The identifying unit 12E analyzes the converted shape data and identifies the uneven area 44. For example, the identifying unit 12E reads the number of layers of base dots P in each pixel position indicated by the shape data, thereby identifying the concave part 42B and the convex part 42A. Then, the identifying unit 12E identifies an area of one dot in the bottom surface of the concave part 42B, which is continuous with the wall surface 42C continuous with the bottom surface and the convex surface of the convex part 42A, as the uneven area 44. Incidentally, the identifying unit 12E can identify an area of two or more dots in the bottom surface of the concave part 42B, which are continuous dots from wall surface 42C toward the center of the bottom surface, as the uneven area 44.

The determining unit 12F determines whether the height of the wall surface 42C continuous with the uneven area 44 identified by the identifying unit 12E is equal to or more than two layers of base dots P. The height of the wall surface 42C corresponds to the length (level difference) between the bottom surface of the concave part 42B and the convex surface of the convex part 42A continuous with the bottom surface through the wall surface 42C.

The determining unit 12F calculates the number of layers of base dots P composing the wall surface 42C continuous with the uneven area 44 indicated by the converted shape data, thereby calculating the height of the wall surface 42C. Then, the determining unit 12F determines whether the calculated height of the wall surface 42C is equal to or more than two layers of base dots P.

The correcting unit 12H corrects the image data so that the brightness of the first image area 45 in the uneven area 44 stacked with multiple dots D and the brightness of the second image area 46 become about the same.

The brightness of the first image area 45 and the brightness of the second image area 46 are about the same, which means the first image area 45 and the second image area 46 have about the same brightness when an image formed on the uneven area 44 is viewed from the vertical direction Z in the XY plane.

About the same brightness means that the brightness is within a margin of error of ±3%.

It is preferable that the correcting unit 12H corrects the image data so that the brightness of the first image area 45 and the brightness of the second image area 46 are about the same in a state where respective hues of the first image area 45 and the second image area 46 indicated by the image data are kept unchanged.

A method of the correction of image data by the correcting unit 12H is explained in detail.

For example, the correcting unit 12H corrects the image data by replacing first color information of the first image area 45 in the image data with higher-brightness color information than second color information of the second image area 46.

Specifically, the correcting unit 12H corrects the image data by replacing first color information of at least some pixels in the first image data of the first image area 45 with higher-brightness color information than second color information of pixels in the second image data of the adjacent second image area 46.

Incidentally, the correcting unit 12H just has to adjust target pixels (dots D) of which the brightness in the first image area 45 is to be increased or the proportion of target pixels (dots D) of which the brightness in the first image area 45 is to be increased so that the brightness of the first image area 45 becomes about the same brightness as the second color information according to the brightness of the second color information of the second image area 46.

Figure 9:
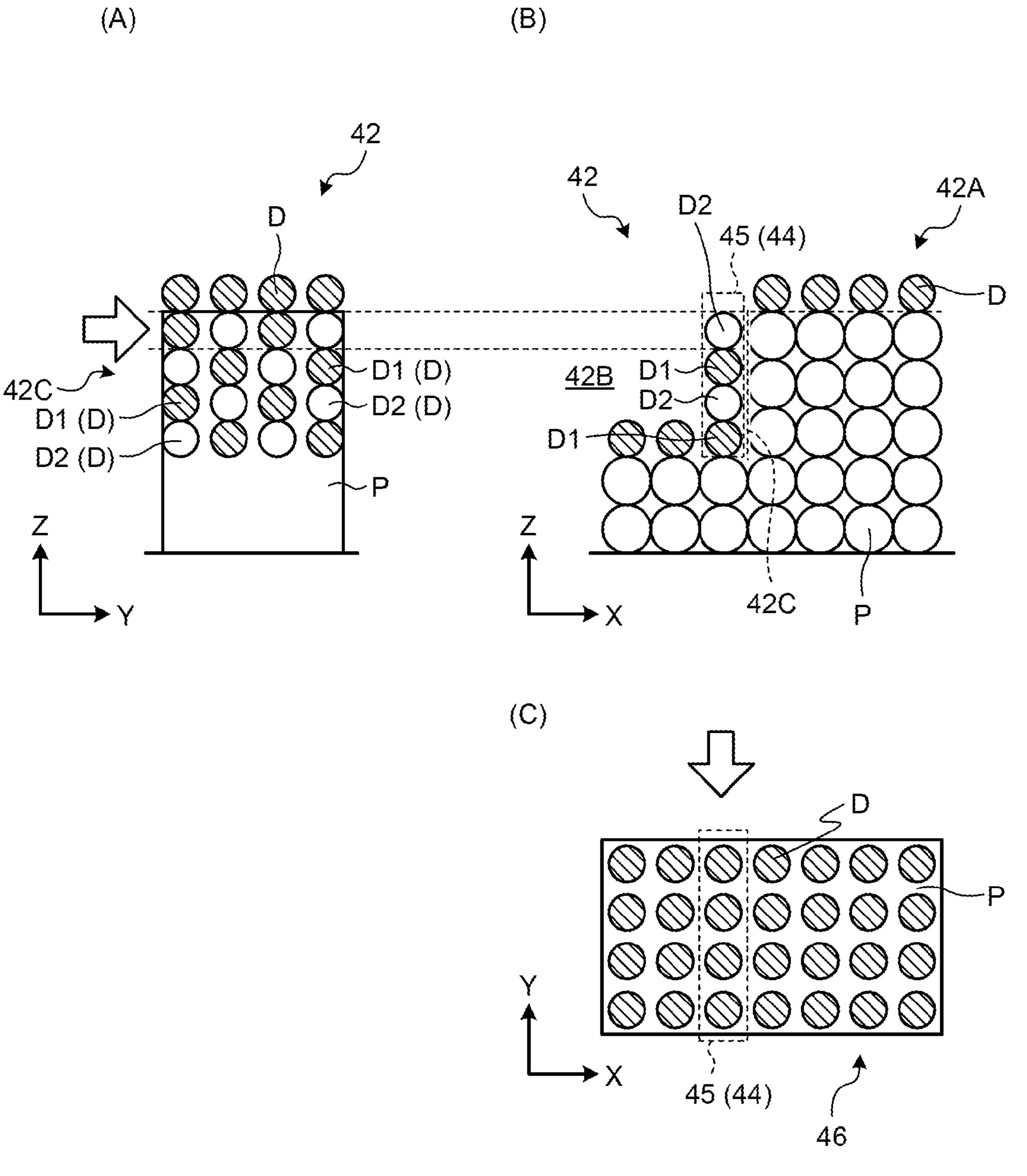
FIG. 9 is an explanatory diagram of replacement of color information.

FIG. 9 is an explanatory diagram of a case where the correcting unit 12H replaces the first color information of the first image area 45 with higher-brightness color information. FIG. 9(A) is a YZ-plane view of the wall surface 42C of the concave-convex area 42 composed of base dots P on which dots D have been formed in the present embodiment viewed from the X-axis direction. FIG. 9(B) is a cross-sectional view of the concave-convex area 42 composed of base dots P on which dots D have been formed in the present embodiment along the Z direction. FIG. 9(C) is an XY-plane view of the image formed on the concave-convex area 42 composed of base dots P in the present embodiment viewed from the side of the vertical direction Z.

First, the correcting unit 12H reads the first image data of the first image area 45 and the second image data of the second image area 46. Specifically, with respect to each pixel position of pixels corresponding to the uneven area 44, the correcting unit 12H reads the number of layers of dots D stacked in each pixel position, a gradation value of a pixel corresponding to each dot D, and first color information of the pixel corresponding to the dot D. Furthermore, the correcting unit 12H reads second color information of pixels adjacent to the uneven area 44 in the second image area 46.

Then, the correcting unit 12H replaces first color information of at least dots D in one layer out of multiple dots D stacked in each pixel position of the uneven area 44 with higher-brightness color information than second color information of pixels in the adjacent second image area 46. Specifically, the correcting unit 12H replaces color information of some of pixels corresponding to the multiple dots D stacked in each pixel position indicated by the first image data with the higher-brightness color information. Accordingly, the correcting unit 12H corrects the image data.

FIG. 9 shows a state where four layers of dots D are stacked in each pixel position of the uneven area 44, and color information of pixels corresponding to dots D in the four layers is replaced so that dots D1 of first color information and dots D2 having higher brightness than second color information of the adjacent second image area 46 are in alternate layers.

In this way, the first color information of the first image area 45 formed on the uneven area 44 in the image data is replaced with higher-brightness color information than the second color information of the second image area 46, so that the brightness of the image of the first image area 45 formed in the concave-convex area 42 becomes about the same brightness as the second image area 46 as shown in FIG. 9(C).

This is because the image data is corrected so that the brightness of at least some of the dots D stacked on the first image area 45 is increased, and therefore, the decrease in brightness due to the superposition of colors of multiple dots D is suppressed.

Furthermore, the correcting unit 12H can use information indicating white color as higher-brightness color information. In this case, the correcting unit 12H converts first color information of first image data into second color information indicating white color so that out of dots D stacked on the uneven area 44, at least one lower layer than the top layer is white color. In this way, the correcting unit 12H can use information indicating white color as higher-brightness color information.

Incidentally, the arrangement of the higher-brightness dots D2 in the cross-section of the first image area 45 formed on the uneven area 44 along the vertical direction Z can be zigzag arrangement as shown in FIG. 9A, or can be arranged by error diffusion.

Furthermore, it is preferable that the correcting unit 12H adjusts the number of layers of dots D stacked on the first image area 45 so that a difference in height between the first image area 45 formed on the uneven area 44 and the second image area 46 adjacent to the first image area 45 is at a minimum when the image data is corrected.

Moreover, it is preferable that the correcting unit 12H adjusts the number of layers of dots D stacked on the first image area 45 so that the adjacent wall surface 42C is covered with dots D.

Incidentally, the correcting unit 12H can correct the image data by correcting a gradation value.

Figure 10:
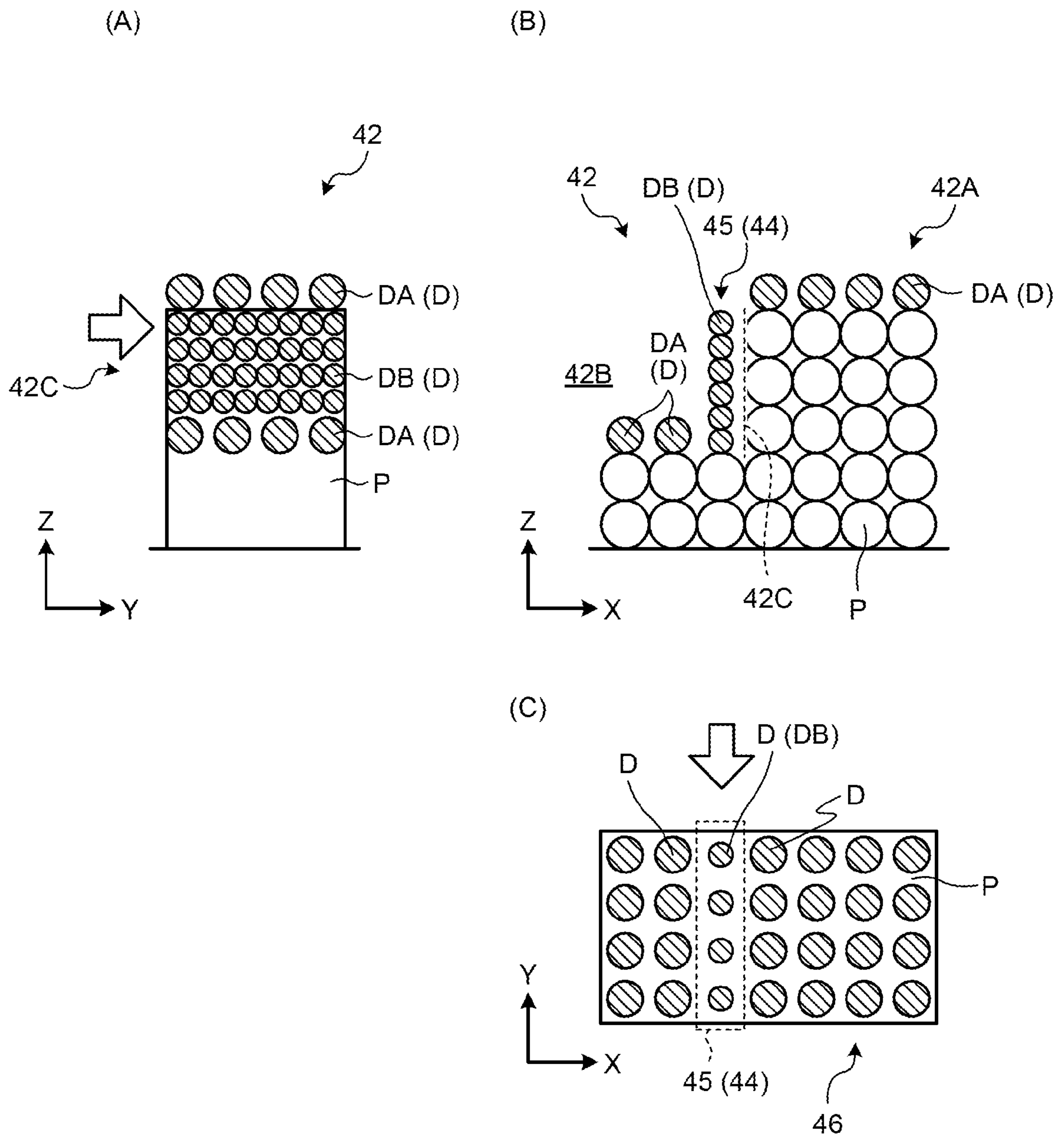
FIG. 10 is an explanatory diagram of correction of gradation values.

FIG. 10 is an explanatory diagram of a case where the correcting unit 12H corrects gradation values of at least some of pixels in the first image data. FIG. 10(A) is a YZ-plane view of the wall surface 42C of the concave-convex area 42 composed of base dots P on which dots D have been formed in the present embodiment viewed from the X-axis direction. FIG. 10(B) is a cross-sectional view of the concave-convex area 42 composed of base dots P on which dots D have been formed in the present embodiment along the Z direction. FIG. 10(C) is an XY-plane view of the image formed on the concave-convex area 42 composed of base dots P in the present embodiment viewed from the side of the vertical direction Z.

The correcting unit 12H can correct image data so that an amount of ink discharged for recording dots D of the first image area 45 in the image data is smaller than an amount of ink discharged for recording dots D of the adjacent second image area 46.

Here, an amount of ink discharged for recording each dot D is determined by a gradation value of a pixel corresponding to the dot D. The larger the gradation value of a pixel is, the larger amount of ink is discharged; the smaller the gradation value of a pixel is, the smaller amount of ink is discharged.

Therefore, the correcting unit 12H corrects the image data so that a gradation value of each pixel in the first image area 45 is smaller than a gradation value of a pixel in the adjacent second image area 46.

Specifically, the correcting unit 12H corrects the image data so that a gradation value of each pixel in the first image data of the first image area 45 is smaller than a gradation value of a pixel in the second image data of the adjacent second image area.

Incidentally, the correcting unit 12H just has to adjust target pixels (dots D) of which the gradation value in the first image area 45 is to be decreased or the proportion of target pixels (dots D) of which the gradation value in the first image area 45 is to be decreased so that the brightness of the first image area 45 becomes about the same brightness as the adjacent second image area 46 according to the second color information of the second image area 46.

First, the correcting unit 12H reads the first image data of the first image area 45 and the second image data of the second image area 46. Specifically, with respect to each pixel position of pixels corresponding to the uneven area 44, the correcting unit 12H reads the number of layers of dots D stacked in each pixel position, a gradation value of a pixel corresponding to each dot D, and first color information of the pixel corresponding to the dot D. Furthermore, the correcting unit 12H reads second color information of pixels adjacent to the uneven area 44 in the second image area 46.

Then, the correcting unit 12H replaces gradation values of multiple dots D stacked in each pixel position of the uneven area 44 with lower gradation values than gradation values of pixels in the adjacent second image area 46. Specifically, the correcting unit 12H replaces gradation values of pixels corresponding to the multiple dots D stacked in each pixel position indicated by the first image data with lower gradation values than gradation values of pixels in the second image area 46. Accordingly, the correcting unit 12H corrects the image data.

Furthermore, it is preferable that the correcting unit 12H adjusts the number of layers of dots D stacked on the first image area 45 so that a difference in height between the first image area 45 formed on the uneven area 44 and the second image area 46 adjacent to the first image area 45 is at a minimum when the image data is corrected.

Moreover, it is preferable that the correcting unit 12H adjusts the number of layers of dots D stacked on the first image area 45 so that the adjacent wall surface 42C is covered with dots D.

FIG. 10 shows a state where six layers of dots D are stacked in each pixel position of the uneven area 44, and gradation values of pixels corresponding to dots D in the six layers are replaced so that the gradation values are smaller than gradation values of pixels corresponding to dots DA which are dots D of the second image area 46.

In this way, the correcting unit 12H replaces gradation values of pixels in the first image area 45 formed on the uneven area 44 in the image data with smaller gradation values than gradation values of pixels in the second image area 46. Accordingly, an amount of ink according to the gradation value is discharged from the recording unit 14, thereby a smaller amount of ink than that before the replacement is discharged onto the uneven area 44. Therefore, the size of dots D stacked on the uneven area 44 becomes the smaller size of dots DB than that before the replacement. Then, smaller dots DB than those before the replacement of gradation values are stacked on the uneven area 44. Therefore, the brightness of the image of the first image area 45 formed on the uneven area 44 becomes about the same brightness as the second image area 46 as shown in FIG. 10C.

This is because the size of dots D stacked on the first image area 45 becomes smaller than that before the replacement, and therefore, an area occupied by the dots D in the first image area 45 decreases, and as a result, the brightness of the overall first image area 45 is improved.

Furthermore, the correcting unit 12H can correct the image data so that an amount of ink (liquid droplets) discharged for recording dots D to be stacked on the uneven area 44 gets smaller towards the upper layer.

To return to FIG. 3, the output unit 12C outputs print data generated by the generating unit 12B to the recording apparatus 30. That is, the print data includes the shape data converted by the converting unit 12G and the image data which has been converted by the converting unit 12G and corrected by the correcting unit 12H. The storage unit 12D stores therein a variety of data.

The recording apparatus 30 includes the recording unit 14, a recording control unit 28, the drive unit 26, and the irradiating unit 20. The recording unit 14, the drive unit 26, and the irradiating unit 20 are described above, so description of these is omitted here.

The recording control unit 28 receives print data from the image processing apparatus 12. The recording control unit 28 reads the shape data and image data included in the received print data. Then, the recording control unit 28 discharges base ink for recording base dots P according to the shape data, and controls the recording unit 14, the drive unit 26, and the irradiating unit 20 to discharge ink for recording dots D according to the image data.

Figure 11:
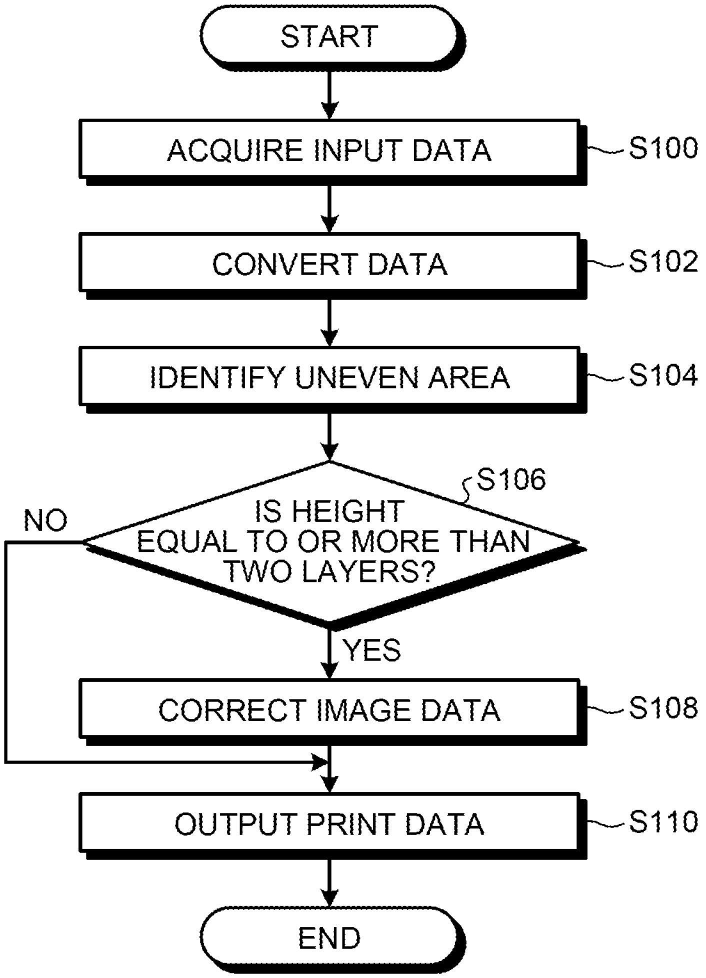
FIG. 11 is a flowchart showing a procedure of image processing.

Subsequently, a procedure of image processing performed by the main control unit 13 of the image processing apparatus 12 is explained. FIG. 11 is a flowchart showing the procedure of the image processing performed by the main control unit 13.

First, the acquiring unit 12A acquires input data from an external device (not shown) (Step S100).

Next, the converting unit 12G converts the input data acquired at Step S100 into a data form that the recording unit 14 can process (Step S102).

Next, the identifying unit 12E analyzes shape data converted by the converting unit 12G and identifies an uneven area 44 (Step S104).

Next, the determining unit 12F determines whether the height of a wall surface 42C continuous with the uneven area 44 identified by the identifying unit 12E is equal to or more than two layers of base dots P (Step S106). When the height of the wall surface 42C is not equal to or more than two layers of base dots P (NO at Step S106), the process moves on to Step S110. On the other hand, when the height of the wall surface 42C is equal to or more than two layers of base dots P (YES at Step S106), the process moves on to Step S108.

At Step S108, the correcting unit 12H corrects image data (Step S108).

At Step S110, the output unit 12C outputs print data including the shape data converted at Step S102 and the image data corrected according to the determination at Step S106 (the image data converted at Step S102 if NO at Step S106) to the recording apparatus 30 (Step S110). Then, the present routine is terminated.

As explained above, in the image processing apparatus 12 according to the present embodiment, the acquiring unit 12A acquires input data including shape data on the concave-convex area 42 having the convex part 42A and the concave part 42B and image data of an image formed on the concave-convex area 42. The identifying unit 12E identifies the uneven area 44 in the bottom surface of the concave part 42B; the uneven area 44 is continuous with the wall surface 42C connecting the bottom surface and the convex surface of the convex part 42A. The correcting unit 12H corrects the image data so that the brightness of the first image area 45 in the uneven area 44 stacked with multiple dots D the uneven area 44 and the brightness of the second image area 46 continuous with the first image area 45 become about the same.

Therefore, in the image processing apparatus 12 according to the present embodiment, as shown in FIGS. 9 and 10, it is possible to prevent the brightness of the first image area 45 formed on the uneven area 44 from decreasing to a lower level than the brightness of the adjacent second image area 46. That is, the visual recognition of a streaky pattern caused by decrease in brightness of the first image area 45 is suppressed.

Therefore, in the image processing apparatus 12 according to the present embodiment, it is possible to suppress decrease in image quality.

Furthermore, in the image processing apparatus 12 according to the present embodiment, the correcting unit 12H adjusts the number of layers of dots D stacked on the first image area 45 so that a difference in height between the first image area 45 formed on the uneven area 44 and the second image area 46 adjacent to the first image area 45 is at a minimum when the image data is corrected. Therefore, the wall surface 42C adjacent to the uneven area 44 is prevented from being exposed to the outside and visually recognize. Accordingly, it is possible to further suppress the decrease in image quality.

Subsequently, a hardware configuration of the main control unit 13 according to the present embodiment is explained.

The main control unit 13 includes a CPU, a read-only memory (ROM), a random access memory (RAM), a hard disk drive (HDD), a hard disk (HD), a network interface (I/F), and an operation panel. The CPU, the ROM, the RAM, the HDD, the HD, the network I/F, and the operation panel are connected to one another by a bus, and the main control unit 13 has a hardware configuration using a general computer.

Programs for performing the above-described various processes executed in the main control unit 13 according to the present embodiment are built into the ROM or the like in advance.

Incidentally, the programs for performing the above-described various processes executed in the main control unit 13 according to the present embodiment can be provided in a manner recorded on a computer-readable recording medium, such as a CD-ROM, a flexible disk (FD), a CD-R, or a digital versatile disk (DVD), in an installable or executable file format.

Furthermore, the programs for performing the above-described various processes executed in the main control unit 13 according to the present embodiment can be provided in a manner stored on a computer connected to a network such as the Internet so that a user can download the programs via the network. Moreover, the programs for performing the above-described various processes executed in the main control unit 13 according to the present embodiment can be provided or distributed via a network such as the Internet.

The programs for performing the above-described various processes executed in the main control unit 13 according to the present embodiment are composed of modules including the above-described units (the acquiring unit 12A, the generating unit 12B, the output unit 12C, the identifying unit 12E, the determining unit 12F, the converting unit 12G, and the correcting unit 12H). The CPU as actual hardware reads out each program from a storage medium such as the ROM and executes the program, thereby the above-described units are loaded onto main storage and generated on the main storage.

According to the present embodiments, it is possible to suppress the decrease in image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus configured to process data to be used for forming an image on a recording medium, the image processing apparatus comprising:

an acquiring unit that acquires input data including (i) shape data of a concave-convex area of the recording medium, the concave-convex area having a convex part and a concave part, and (ii) image data of an image to be formed on the concave-convex area of the recording medium;

an identifying unit that identifies an uneven area which is within a bottom surface of the concave part and is continuous with a wall surface connecting the bottom surface and a convex surface of the convex part of the recording medium; and a correcting unit that corrects the image data so that the brightness of a first image area in the uneven area stacked with multiple dots and the brightness of a second image area continuous with at least the first image area become about the same, wherein the second image area is an area other than the first image area in the image to be formed on the concave-convex area of the recording medium.

2. The image processing apparatus according to claim 1, wherein the correcting unit corrects the image data by replacing first color information of the first image area in the image data with higher-brightness color information than second color information of the second image area.

3. The image processing apparatus according to claim 1, wherein the correcting unit corrects the image data so that out of the multiple dots stacked on the uneven area, at least one lower layer than the top layer is white color.

4. The image processing apparatus according to claim 1, wherein the correcting unit corrects the image data so that an amount of liquid droplets discharged for recording dots of the first image area in the image data of the image to be formed by a recording head, which records dots by discharging liquid droplets from a plurality of nozzles, is smaller than an amount of liquid droplets discharged for recording dots of the second image area.

5. The image processing apparatus according to claim 4, wherein the correcting unit corrects the image data so that a gradation value of each pixel in the first image area is smaller than a gradation value of a pixel in the second image area.

6. The image processing apparatus according to claim 4, wherein the correcting unit corrects the image data so that an amount of liquid droplets discharged for recording dots to be stacked on the uneven area gets smaller towards an upper layer.

7. The image processing apparatus according to claim 4, wherein the correcting unit adjusts the number of layers of dots stacked on the first image area so that a difference in height between the first image area to be formed on the uneven area and the second image area adjacent to the first image area is at a minimum.

8. The image processing apparatus according to claim 7, wherein the correcting unit adjusts the number of layers of dots stacked on the first image area so that the wall surface is covered with dots.

9. A non-transitory computer-readable medium comprising computer readable program codes, performed by a computer, the program codes when executed causing the computer to execute:

acquiring input data including (i) shape data of a concave-convex area of a recording medium, the concave-convex area having a convex part and a concave part, and (ii) image data of an image to be formed on the concave-convex area of the recording medium;

identifying an uneven area which is within a bottom surface of the concave part and is continuous with a wall surface connecting the bottom surface and a convex surface of the convex part of the recording medium; and correcting the image data so that the brightness of a first image area in the uneven area stacked with multiple dots and the brightness of a second image area continuous with at least the first image area become about the same, wherein the second image area is an area other than the first image area in the image to be formed on the concave-convex area of the recording medium.

10. An image processing method performed by a computer, the method comprising:

acquiring input data including (i) shape data of a concave-convex area of a recording medium, the concave-convex area having a convex part and a concave part and (ii) image data of an image to be formed on the concave-convex area of the recording medium;

identifying an uneven area which is within a bottom surface of the concave part and is continuous with a wall surface connecting the bottom surface and a convex surface of the convex part of the recording medium; and correcting the image data so that the brightness of a first image area in the uneven area stacked with multiple dots and the brightness of a second image area continuous with at least the first image area become about the same, wherein the second image area is an area other than the first image area in the image formed on the concave-convex area of the recording medium.

* * * * *